Patented Mar. 10, 1936

2,033,126

UNITED STATES PATENT OFFICE 2,033,126

MANUFACTURE OF CELLULOSE DERIVATIVES

Henry Dreyfus, London, England

No Drawing. Application January 25, 1933, Serial No. 653,472. In Great Britain February 12, 1932

17 Claims. (Cl. 260—152)

This invention is concerned with an improved manufacture of cellulose derivatives and more particularly cellulose derivatives containing hydroxylated ether groups.

In U. S. Patent No. 1,502,379, I have described broadly the introduction of glycol, glycerol or other polyhydric alcohol radicles into cellulose, i. e. broadly the manufacture of hydroxylated ethers of cellulose. In particular I have instanced the method of employing halogen esters of the glycols, glycerol, etc., as etherifying agents, for instance the chlorhydrins, and in British Patent No. 277,721 of 26th March, 1926 I have referred to the use of alkylene oxides for this purpose. While broadly the etherification with the said substances may be conducted in the presence of basic substances generally, I have particularly instanced the caustic alkalies.

I have now found that the etherification giving rise to hydroxy ethers of cellulose, and particularly an etherification with the aid of alkylene oxides, may with great advantage be conducted in presence of primary or secondary organic bases, and especially primary or secondary aliphatic bases. The hydroxylated ethers of cellulose thus produced appear to have a very high degree of resistance to heat.

As examples of organic bases which may be used in accordance with the present invention I may instance methylamine, dimethylamine, ethylamine, and diethylamine, amylamine, hexylamine and dihexylamine, the amines obtainable by chlorination of paraffin hydrocarbons followed by amidation with ammonia or monoalkylamines and similar products obtainable from higher fatty acids and in the aromatic series benzylamine and its homologues and substitution products and particularly N-alkyl substitution products, dibenzylamine, methyl aniline and other N-alkylated or aralkylated aromatic or aralkyl amines and piperidine. Instead of using the organic base directly, its reaction product with the alkylene oxide or chlorhydrin may be used, as for example hydroxyethylmethylamine or hydroxyethylethylamine, etc. The primary or secondary organic base may be employed in any suitable amount. Thus the proportions of organic base may be as much as 50–100% or more calculated on the weight of the cellulosic material. In general however it is preferred to employ smaller amounts, e. g. proportions of 30–20–10% or even less calculated on the weight of the cellulosic material.

The reaction with the etherifying agent may be carried out at ordinary or reduced pressure, but is preferably conducted under increased pressure in an autoclave, for example at pressures of the order of 5, 10 or 20 atmospheres. Raised temperatures facilitate the conduct of the reaction and it is in general desirable to employ temperatures of about 80° to 120° C. or 150° C. The reaction may be carried out with the reagents in the liquid phase, under pressure if this be necessary to maintain the liquid phase, or where possible the etherifying agent, with or without the organic base, may be applied in the vapour or gaseous phase. In applying the etherifying agent only in the gaseous or vapour phase, the cellulose may be suitably impregnated with the organic base previous to passage of the alkylene oxide or other etherifying agent, such impregnation being effected if desired under pressure. In gaseous phase reactions the cellulose may be more or less dry and may be treated in a current of the etherifying agent, or alternatively it may be suspended in a suitable medium which may consist of the organic base or may contain the organic base in solution in an inert medium, such as a hydrocarbon, and the etherifying agent may then be passed through. Gaseous phase reactions are preferably conducted under pressure, for example pressure produced with the aid of the alkylene oxide itself. Similarly liquid phase reactions may be effected in presence or absence of hydrocarbons or other inert media, e. g. such as are described in my British Patent No. 277,721. The medium employed will usually be a non-solvent for the cellulose ether produced. In reactions carried out in the gaseous phase the gaseous substances may be employed either alone or in admixture with an inert gas, for example nitrogen or carbon dioxide.

The cellulose starting material may be cotton linters or other form of waste cotton, sulphite pulp, sulphate pulp or soda pulp, preferably purified from residual lignone products, as for example by the alkaline purifying step of my U. S. Patent No. 1,711,110. Any cellulose derivative still containing free hydroxy groups, for example a partially benzoylated cellulose, may also be used as starting material or a cellulose ester which is saponifiable under the conditions of the reaction. If desired, water may be removed from the cellulosic starting materials either by drying or by the addition of suitable water binding agents, for example, lime and similar substances as described in my British Patent No. 277,721.

As previously indicated I prefer to employ alkylene oxides as etherifying agents, for example ethylene oxide, propylene oxide, butylene oxide, epichlorhydrin, glycide or glycidic acid.

The following examples are given by way of illustration only and are not to be considered as limiting the invention in any way:—

*Example 1*

100 parts of cotton linters are heated in an autoclave with 200 parts of ethylene oxide and 10 parts of diethylamine at a temperature of 80° C. for a period of 4–6 hours. At the end of this time the excess volatile substances are removed from the cellulose derivative obtained by reducing the pressure.

*Example 2*

100 parts of cotton linters are treated with propylamine under such conditions that a mass containing 10–20% of propylamine homogeneously distributed is obtained. The product is then placed in an autoclave, the temperature is raised to 100° C. and ethylene oxide is introduced under pressure until such time as no more is absorbed by the cellulosic material. The volatile substances are then removed by reducing the pressure, and the cellulose derivative may then be washed and dried.

*Example 3*

100 parts of cotton linters are placed in an autoclave with 20 parts of hydroxypropylmethylamine (produced by condensing methylamine with propylene oxide) and an excess of propylene oxide. The temperature is raised to 120° C. and maintained there for several hours. After removing excess volatile reagents the cellulose derivative produced is carefully washed and dried.

The products, and more especially those containing only oxyalkyl substituents on the cellulose molecule or containing a relatively high proportion of such substituents, may be employed as sizes for textile and other purposes, as thickening agents in textile printing and padding operations and in general for all uses to which colloids, which are water soluble or are readily dispersed or swollen in water, are applied. They may be acetylated or otherwise esterified or methylated, benzylated or otherwise etherified, whether they have been substituted by the hydroxyalkyl groups to a high or low degree, to produce products which may be used in the varnish, plastic, artificial silk and film arts.

What I claim and desire to secure by Letters Patent is:—

1. Process for the production of hydroxy-ethers of cellulose, which comprises causing a hydroxyalkylating agent to react with cellulose with the aid of an organic base containing at least one hydrogen atom and at least one unsubstituted hydrocarbon radicle both directly attached to nitrogen.

2. Process for the production of hydroxy-ethers of cellulose, which comprises causing an alkylene oxide to react with cellulose with the aid of an organic base containing at least one hydrogen atom and at least one alkyl radicle both directly attached to nitrogen.

3. Process for the production of hydroxy-ethers of cellulose, which comprises causing an alkylene oxide to react with cellulose with the aid of an organic base containing at least one hydrogen atom and at least one aralkyl radicle both directly attached to nitrogen.

4. Process for the production of hydroxy-ethyl cellulose, which comprises causing ethylene oxide to react wtih cellulose with the aid of an organic base containing at least one hydrogen atom and at least one alkyl radicle both directly attached to nitrogen.

5. Process for the production of hydroxy-ethers of cellulose, which comprises causing a hydroxyalkylating agent to react with cellulose under pressure higher than atmospheric, with the aid of an organic base containing at least one hydrogen atom and at least one unsubstituted hydrocarbon radicle both directly attached to nitrogen.

6. Process for the production of hydroxy-ethers of cellulose, which comprises causing an alkylene oxide to react with cellulose, under a pressure of 10–20 atmospheres, with the aid of an organic base containing at least one hydrogen atom and at least one alkyl radicle both directly attached to nitrogen.

7. Process for the production of hydroxy-ethyl cellulose, which comprises causing ethylene oxide to react with cellulose, under a pressure of 10–20 atmospheres, with the aid of an organic base containing at least one hydrogen atom and at least one alkyl radicle both directly attached to nitrogen.

8. Process for the production of hydroxy-ethers of cellulose, which comprises causing an alkylene oxide to react with cellulose, under a pressure of 10–20 atmospheres and at an elevated temperature, with the aid of an organic base containing at least one hydrogen atom and at least one alkyl radicle both directly attached to nitrogen.

9. Process for the production of hydroxy-ethyl cellulose, which comprises causing ethylene oxide to react with cellulose, under a pressure of 10–20 atmospheres and at a temperature of 80–150° C., with the aid of an organic base containing at least one hydrogen atom and at least one alkyl radicle both directly attached to nitrogen.

10. Process for the production of hydroxy ethers of cellulose, which comprises causing a hydroxyalkylating agent to react with cellulose, in the presence of an inert liquid medium under pressure and at an elevated temperature, with the aid of an organic base containing at least one hydrogen atom and at least one alkyl radicle both directly attached to nitrogen.

11. Process for the production of hydroxy-ethyl cellulose, which comprises causing ethylene oxide to react with cellulose, in the presence of an inert liquid medium under a pressure of 10–20 atmospheres and at a temperature of 80–120° C., with the aid of an organic base containing at least one hydrogen atom and at least one alkyl radicle both directly attached to nitrogen.

12. Process according to claim 1, wherein, before reaction with the cellulose, the organic base is brought into contact with the hydroxyalkylating agent under conditions such that condensation between the two occurs.

13. Process according to claim 2, wherein, before reaction with the cellulose, the organic base is brought into contact with the alkylene oxide under conditions such that condensation between the two occurs.

14. Process according to claim 3, wherein, before reaction with the cellulose, the organic base is brought into contact with the alkylene oxide under conditions such that condensation between the two occurs.

15. Process according to claim 4, wherein, before reaction with the cellulose, the organic base is brought into contact with ethylene oxide under conditions such that condensation between the two occurs.

16. Process for the production of mixed cellulose derivatives, which comprises causing a hydroxyalkylating agent to react with cellulose with the aid of an organic base containing at least one hydrogen atom and at least one unsubstituted hydrocarbon radicle both directly attached to nitrogen, and then subjecting the hydroxy-ether of cellulose so formed to reaction with an agent selected from the group consisting of esterifying and etherifying agents.

17. Process for the production of mixed cellulose derivatives, which comprises causing ethylene oxide to react with cellulose, under a pressure of 10–20 atmospheres and at a temperature of 80–150° C., with the aid of an organic base containing at least one hydrogen atom and at least one alkyl radicle both directly attached to nitrogen, and then subjecting the hydroxy-ethyl cellulose so formed to reaction with an agent selected from the group consisting of esterifying and etherifying agents.

HENRY DREYFUS.